United States Patent [19]

Suzuki et al.

[11] 4,413,877
[45] Nov. 8, 1983

[54] SELECTIVELY LIGHT-TRANSMITTING LAMINATED STRUCTURE

[75] Inventors: Kazutomi Suzuki; Hitoshi Mikoshiba, both of Hino; Yuji Mitani, Hachioji, all of Japan

[73] Assignee: Teijin Limited, Osaka, Japan

[21] Appl. No.: 438,535

[22] Filed: Nov. 1, 1982

Related U.S. Application Data

[63] Continuation of Ser. No. 240,814, Mar. 5, 1981, abandoned.

[30] Foreign Application Priority Data

| Mar. 10, 1980 | [JP] | Japan | 55-24238 |
| Jun. 2, 1980 | [JP] | Japan | 55-72679 |
| Jun. 4, 1980 | [JP] | Japan | 55-74182 |
| Jun. 4, 1980 | [JP] | Japan | 55-74183 |

[51] Int. Cl.$^3$ .................................................. G02B 5/24
[52] U.S. Cl. ..................................... 350/1.7; 427/160
[58] Field of Search ................. 427/160, 166; 350/1.7

[56] References Cited
U.S. PATENT DOCUMENTS

| 3,682,528 | 8/1972 | Apfel | 350/1.7 |
| 4,166,876 | 9/1979 | Chiba | 428/215 |
| 4,226,910 | 10/1980 | Dahlen et al. | 428/336 |

*Primary Examiner*—Sam Silverberg
*Attorney, Agent, or Firm*—Sherman & Shalloway

[57] ABSTRACT

In a selectively light-transmitting laminated structure composed of (1) a substrate layer (A) of a transparent sheet-like structure,
(2) a heat wave-reflective layer (D) of a silver-containing metal having a thickness of 50 to 300 Å formed on layer (A),
(3) either a transparent thin layer ($B_1$) having a high refractive index placed between layers (A) and (D), or a transparent thin layer ($B_2$) having a high refractive index on layer (D), or both layers ($B_1$) and ($B_2$), and
(4) optionally, a transparent top layer (E) on layer (D); the improvement wherein a thin layer (C) having a thickness of 3 to 100 Å and deposited as a material selected from the group consisting of Ti, Zr, In, Si, C, Co and Ni is provided on layer (D) in contact therewith.

24 Claims, No Drawings

SELECTIVELY LIGHT-TRANSMITTING LAMINATED STRUCTURE

This is a continuation of application Ser. No. 240,814, filed Mar. 5, 1981 now abandoned.

This invention relates to a selectively light-transmitting laminated structure having various superior properties, which permits transmission of visible light and reflection of heat waves or infrared rays. Specifically, it relates to an improved selectively light-transmitting laminated structure which has improved resistance to light, heat, gases, etc., particularly showing remarkably improved resistance to heat degradation demonstrated by a degradation time (as defined hereinbelow) of usually at least about 1,000 hours, and frequently more than about 5,000 hours, as a result of providing a layer deposited as a material selected from the group consisting of Ti, Zr, In, Si, C, Co and Ni on the surface of a heat wave-reflective silver-containing metallic layer.

More specifically, this invention pertains to a selectively light-transmitting laminated structure composed of (1) a substrate layer (A) of a transparent sheet-like structure,
(2) a heat wave-reflective layer (D) of a silver-containing metal having a thickness of 50 to 300 Å formed on layer (A),
(3) either a transparent thin layer ($B_1$) having a high refractive index placed between layers (A) and (D), or a transparent thin layer ($B_2$) having a high refractive index on layer (D), or both layers ($B_1$) and ($B_2$), and
(4) optionally, a transparent top layer (E) on layer (D);

characterized in that a thin layer (C) having a thickness of 3 to 100 Å and deposited as a material selected from the group consisting of Ti, Zr, In, Si, C, Co and Ni is provided on layer (D) in contact therewith.

A great number of suggestions about a heat wave-reflective or electrically conductive laminated structure or the like have been made in many patent documents including U.S. Pat. Nos. 3,698,946, 3,962,488, 4,017,661 and 4,020,389, Japanese Laid-Open Patent Publication No. 66841/76, British Pat. No. 1,307,642 French Pat. No. 2043002, Belgian Pat. No. 693528, Canadian Pat. No. 840513, West German OLS Nos. 2813394, 2828576, and European Patent Application No. 80302985.

Selectively light-transmitting layers are useful as transparent thermal insulating layers because they are transparent to light in the visible region but have the ability to reflect infrared light (including near infrared light). Accordingly, they can be used in solar energy collectors (water heaters), power generation by solar energy, window portions of greenhouses and window portions of refrigerated and cooled showcases.

In particular, these layers will gain increasing importance because of their ability to act as transparent heat insulating windows which utilize solar energy and prevent dissipation of energy in modern buildings in which the windows occupy a large proportion of the wall surface. They are also important as films for greenhouses in agriculture which are used in cultivating vegetables and fruits.

Thus, the selectively light-transmitting layers are important from the standpoint of the utilization of solar energy, and it is desired in the art to provide large quantities of such films of uniform quality and high performance at low cost.

Known transparent thin layers of electrically conductive metal disclosed in the above-mentioned patent documents and elsewhere include (i) thin layer of metals such as gold, copper, silver, and palladium, (ii) thin layer of compound semiconductors such as indium oxide, tin oxide and copper iodide, and (iii) thin layer of electrically conductive metals such as gold, silver, copper and palladium which are made selectively transparent over a certain wavelength region. Indium oxide or tin oxide layer having a thickness of several thousand Angstroms and laminates of metallic layer and transparent conductive layer are known to be selectively transparent and having a high ability to reflect infrared radiation. However, transparent electrically conductive film or selectively light-transmitting film having superior performances have not been produced commercially at low cost.

The above-cited West German OLS No. 2813394 discloses a transparent, electrically conductive laminated structure composed of (A) a transparent solid substrate,
(B) a thin layer of an oxide of titanium in contact with said substrate (A),
(C) a thin layer of an electrically conductive metal in contact with said layer (B),
(D) a thin layer of an oxide of titanium in contact with said layer (C), and
(E) optionally, a transparent top layer in contact with said layer (D), characterized in that (i) said substrate (A) is a film-forming synthetic resin layer, and
(ii) said layer (B) is a layer of an oxide of titanium derived from a layer of an organic titanium compound and containing an organic residual moiety of said organic titanium compound.

In this patent document, a unitary thin metal layer containing both silver and copper is recommended as a preferred species of the thin layer (C) of electrically conductive metal. In particular, the use of layer (C) composed of Ag and Cu with a Cu content of 1 to 30% by weight based on the total weight of Ag and Cu is recommended.

The West German OLS 2828576 recommends the use of a thin layer of a metal selected from gold, silver, copper, aluminum, and mixtures or alloys of at least two of these.

European Patent Application Publication No. 0007224 recommends a heat wave-reflective or electrically conductive laminated structure composed of (A a shaped solid substrate,
(B) a transparent thin layer having a high refractive index in contact with said substrate (A),
(C) a transparent heat wave-reflective layer of an electrically conductive metal in contact with said layer (B), and
(D) optionally, a transparent thin layer having a high refractive index (D') in contact with said layer (C) and transparent top layer (D'') in contact with said transparent thin layer (D');

characterized in that said layer (C) is a layer composed of Ag and Au in which the amount of Au is 3 to 30% by weight based on the total weight of Ag and Au.

To the best of the knowledges of the present inventors, however, none of the prior literature discloses a heat wave-reflective or electrically conductive laminated structure having a layer which is deposited on a heat wave-reflective Ag-containing metallic layer in contact therewith, as a material selected from the group consisting of Ti, Zr, Si, In, C, Co and Ni.

The present inventors noted that a selectively light-transmitting laminated structure having a transparent thin layer with a high refractive index provided on a heat wave-reflective Ag-containing metallic layer in contact therewith, such as the one mentioned above, undergoes degradation in performance by the influences of heat, light, environmental gases, etc.

Their investigations made in an attempt to overcome this technical difficulty with ease and at low cost have led to the discovery that by providing a thin layer deposited as a material selected from the group consisting of Ti, Zr, Si, In, C, Co and Ni on, or both on and beneath, the heat wave-reflective layer of a silver-containing metal, the above technical difficulty due presumably to the surface diffusion of Ag in the heat wave-reflective Ag-containing metallic layer which is caused by environmental factors such as heat, light, and gases can be overcome, and a selectively light-transmitting laminated structure having markedly improved environmental durability can be produced.

The thin layer of such a material may be formed on the heat wave-reflective Ag-containing metallic layer by known means such as vacuum deposition and sputtering. It has been found that the material forming this layer should be deposited under conditions which do not convert it to its oxide or other compound as much as possible, and specifically, the thin layer should be deposited as a material selected from the group consisting of Ti, Zr, Si, In, C, Co and Ni.

Accordingly, there can be provided a selectively light-transmitting laminated structure which shows various superior properties, and above all, a markedly high resistance to heat degradation demonstrated by a degradation time of at least about 1,000 hours, and frequently more than about 5,000 hours, the degradation time being defined as the time which elapses until the infrared reflectance at a wavelength of 9.8 or 10 microns of a sample decreases to 85% thereof in a degradation test at 90° C.

It is an object of this invention therefore to provide a selectively light-transmitting laminated structure having various improved and superior properties.

The above and other objects and advantages of this invention will become more apparent from the following description.

The laminated structure in accordance with this invention is composed of
(1) a substrate layer (A) of a transparent sheet-like structure,
(2) a heat wave-reflective layer (D) of a silver-containing metal having a thickness of 50 to 300 Å formed on layer (A),
(3) either a transparent thin layer ($B_1$) having a high refractive index placed between layers (A) and (D), or a transparent thin layer ($B_2$) having a high refractive index on layer (D), or both layers ($B_1$) and ($B_2$), and
(4) optionally, a transparent top layer E on layer (D); characterized in that a thin layer (C) having a thickness of 3 to 100 Å and deposited as a material selected from the group consisting of Ti, Zr, In, Si, C, Co and Ni is provided on layer (D) in contact therewith.

In an alternative embodiment, the layer (C) may additionally be formed beneath the layer (D) in contact therewith.

The substrate layer (A) may be a layer of a shaped solid substrate made of an organic material, an inorganic material or a combination of these. In the present invention, the term "transparent sheet-like structure" is meant to include such shapes as films, sheets and plates, and the term "transparent" also includes a colored and transparent state.

In the substrate layer (A), the organic material is preferably an organic synthetic resin. Specific examples of the resin include thermoplastic resins such as polyethylene terephthalate, polyethylene naphthalate, polycarbonate, acrylic resin, ABS resin, polystyrene, polyacetal, polyethylene, polypropylene, polyamides, and fluorocarbon resins; thermosetting resins such as epoxy resins, diallyl phthalate resins, silicon resins, unsaturated polyester resins, phenolic resins and urea resins; and solvent-soluble resins such as polyvinyl alcohol, polyacrylonitrile, polyurethane, aromatic polyamides, and polyimides. These are in the form of homopolymers or copolymers and may be used either singly or as a mixture.

The shaped solid substrate made of an inorganic material may, for example, be a shaped article of a vitreous material such as soda glass, borosilicate glass and silicate glass, a metal oxide such as alumina, silica, magnesia and zirconia, and semiconductors such as gallium-arsenic, indium-phosphorus, silicon and germanium.

The heat wave-reflective layer (D) of a silver-containing metal having a thickness of 50 to 300 Å may be a layer of Ag, or both Ag and another metal or metal compound. Examples of the metal or metal compounds which may be present together with Ag are Au, Cu, Al, In, Zn, and Sn, above all Au and Cu, and the compounds thereof. For example, the layer (D) of the Ag-containing metal may be a layer of Ag, a layer of Ag containing up to 30% by weight of Cu, a layer of Ag containing up to 30% by weight of Au, a layer of Ag containing both up to 30% by weight of Cu and up to 30% by weight of Au. The light resistance of the selectively light-transmitting laminated structure in accordance with this invention may be improved by including 0.1 to 30% by weight, preferably 0.3 to 15% by weight, of Cu in Ag. The heat resistance of the laminated structure of this invention can be improved by including 3 to 30% by weight of Au in Ag.

The heat wave-reflective layer (D) of a silver-containing metal has a thickness of 50 to 300 Å, preferably 70 to 200 Å. If the thickness of the layer (D) is too small below 50 Å, the infrared reflectance and heat resistance of the laminated structure tend to be reduced. If the thickness of the layer (D) is too large beyond 300 Å, the visible light transmittance of the laminated structure decreases so that it is no longer feasible in practical applications.

Known means can be used to form the thin Ag-containing metallic layer (D). For example, there can be used a vacuum deposition method, a cathode sputtering method, a plasma flame spraying method, a vapor phase plating method, an electroless plating method, an electroplating method, a chemical coating method, and combinations of these methods.

The layer C having a thickness of 3 to 100 Å and deposited as a material selected from the group consisting of Ti, Zr, Si, In, C, Co and Ni, which is the important feature of the selectively light-transmitting laminated structure of this invention, is formed on the layer (D), or both on and beneath the layer (D), in contact therewith by means known per se, such as vacuum deposition and cathode sputtering.

At least at this time, the above material is deposited under such conditions that its conversion to its oxide or another compound is prevented as much as possible. A minor degree of oxidation, for example the formation of $TiO_x$ where x is less than 1.3, preferably not more than 1, in the case of Ti, may be permissible. It is preferred to choose conditions so that partial oxidation beyond this degree or complete oxidation may not take place. The same can be said with respect to the other materials constituting the layer C. The allowable degree of partial oxidation is for example, $MO_x$ where M is a metal and x is less than about 1.0.

The layer C deposited as a material selected from the group consisting of Ti, Zr, Si, In, C, Co and Ni (including, of course, a mixture of two or more of these metals) may further contain a very small amount of another metal or metal compound.

The layer C has a thickness of 3 to 100 Å, preferably 10 to 50 Å. The thickness of the layer C is properly varied depending upon the material which constitutes the layer C, and whether it is provided only on the layer D or both on and beneath the layer D. For example, when the layer C is provided only on the layer D in contact therewith, its minimum thickness is preferably 25 Å, especially 30 Å. When the layer C is provided both on and beneath the layer D in contact therewith, the total minimum thickness of the two layers C is preferably 10 Å, especially 15 Å. The thickness of the layer C may also be chosen depending upon the type of the material constituting the layer C. For example, in the first-mentioned case, the thickness of the layer C may be at least 30 Å for Ti, and at least 25 Å for Si, Co, In, Zr, C, and Ni. In the latter case, the total thickness may, for example, be at least 10 Å for Ti, Si and Zr.

If the thickness of the layer C is too small beyond the above-specified range, there is little effect of improving the durability of the laminated structure. On the other hand, if it is too large beyond 100 Å, the transmittance of the laminated structure in the visible region decreases markedly so that the resulting laminated structure is not sufficiently selectively light-transmitting.

When the layer C is provided both on and beneath the layer D, it brings about the advantage that each layer C may have a smaller thickness.

In the present invention, the transparent thin layer $(B_1)$ and/or $(B_2)$ having a high refractive index is a layer of an oxide of a metal preferably selected from the group consisting of Ti, In, Zn, Sn, Y, Er, Zr, Ce, Ta, Ge and Hf (including mixtures of two or more of these), or a layer of ZnS. The refractive index of the layer $(B_1)$ or $(B_2)$ is, for example, at least 1.6, preferably at least 1.8, especially preferably at least 2.0, and its visible light transmittance is at least 60%, preferably at least 75%.

A thin layer of an oxide of titanium is especially preferred as the layer $(B_1)$ and/or $(B_2)$.

The thickness of the layer $(B_1)$ or $(B_2)$ is preferably 50 to 500 Å, especially preferably 150 to 400 Å. Thicknesses outside the specified range tend to cause a reduction in the visible light transmittance of the laminated structure. The transparent thin layer $(B_1)$ and/or $(B_2)$ can be formed by known means such as sputtering, ion plating, vacuum deposition, wet-method coating, etc.

The wet-method coating is a process which comprises coating a solution of a metal alcoholate, etc., and hydrolyzing the coating to form a metal oxide layer. For the purpose of this invention, there can be used organometallic compounds, for example organotitanate compounds such as tetrabutoxy titanate, organozirconate compounds such as tetrabutoxyzirconate, organoaluminum compounds such as aluminum tri-sec-butoxide, and organogermanium compounds such as tetrabutoxy germanium, may be used as a material for forming the metal oxide layer. These compounds can be used in this invention because the alkoxy group bonded to the metal atom can be ester-interchanged or polycondensed by known methods. Several kinds of metal alkoxides may be used as mixed or polycondensed, and in this case, the metal alkoxides may have different metal atoms from each other.

For example, in the case of organotitanates taken up as an example of the metal alkoxide, the alkyl group may, for example, be ethyl, propyl, isopropyl, butyl, 2-ethylhexyl, stearyl, etc., and a condensate obtained by condensing two or more of these tetraalkyl titanates may also be used. Or as stated above, metal alkoxides of different metals, such as aluminum tri-sec-butoxide, aluminum tri-iso-propoxide, tetrabutoxy zirconate and tetrabutoxy germanium may be used as condensed or mixed.

An organic silicate compound which by itself can only give a film having a low refractive index, such as monomethyltrimethoxysilane or monoethyltriethoxysilane, may be mixed in a proportion such that the refractive index of the entire metal oxide layer does not decrease beyond 1.6.

The layer may be formed by diluting the metal alkoxide compound or its condensation product or its mixture in a suitable solvent, coating the resulting solution, and drying the coated layer so as to induce polymerization. The solvent used for this purpose must meet certain requirements for solubility in metal alkoxides, boiling points and inertness (the property of not inhibiting the crosslinking of the metal alkoxides by condensation). Examples of the solvet include hydrocarbons such as n-heptane and cyclohexane, hydrocarbon mixtures such as ligroin, solvent naphtha, petroleum benzine and petroleum ether, and mixtures of these.

Addition of a catalyst may be effective in order to promote the formation of a transparent layer having a high refractive index. The catalyst may be any which promotes the hydrolysis and condensation of the metal alkoxide, and includes, for example, sodium acetate, potassium acetate and metal naphthenates. The mixing of different kinds of metal alkoxides is an effective means as the addition of a silicon alkoxide is effective for curing of a titanium alkoxide.

The provision of at least one of the layers $(B_1)$ and $(B_2)$ is essential in the selectively light-transmitting laminated structure of this invention. The laminated structure does not necessarily contain only one combination of the layer D and the layer or layers (C), and two or more such combinations may exist in the laminated structure of the invention.

The laminated structure of this invention may further include a transparent top layer (E) as an optional layer. The top layer (E) serves to improve the surface hardness, light resistance, gas resistance, water resistance, etc. of the structure. Examples of materials which can be used to form this top layer (E) include organic materials, for example acrylic resins such as polymethyl methacrylate resin, polyacrylonitrile resin, polymethacrylonitrile resin, polyolefin resins such as polypropylene, silicon resins such as a polymer derived from ethyl silicate, polyester resins, fluorine-containing resins, and inorganic substances such as silicon oxide.

The top layer (E) can be formed by known means such as coating, film-lamination and vapor deposition. The thickness of the top layer (E) may be chosen properly, and is, for example, 0.05 to 10 microns, preferably 0.1 to 5 microns. An underlayer may be provided beneath the top layer in order to improve adhesion, etc.

The laminated structure of this invention constructed as described hereinabove has excellent durability, and can be used advantageously in a wide range of applications for heat wave-reflection by dint of its heat wave-reflecting property, and also in a broad range of electronics applications by dint of its electrical conductivity.

For example, the selective light-transmitting laminated structure of this invention may be used as a selectively light-transmitting material for the effective utilization of sunlight, and/or as an energy saving material by utilizing its thermal insulating property. Moreover, it may be used as a transparent electrode for liquid crystal displays, electroluminescence, a photoconductive photosensitive material, an antistatic layer, and a panel heater by utilizing its electro-conductive property.

By controlling the thickness of the thin metal layer (D) of the Ag-containing metal, the thickness of the thin layer (C), and the thickness of the layer ($B_1$) and/or ($B_2$), and the method of laminating them, the visible light transmittance, surface resistance and infrared reflectance of the laminated structure of the invention can be freely changed as required.

Typical uses of the laminated structure thus obtained include a transparent electrically conductive laminate in an antistatic or photoconductive photosensitive layer, a transparent electrode for a solid display or panel illuminator such as a liquid crystal electro-illuminator, a transparent panel heater as a heater such as a defrost heater for the windows of motor vehicles, and a transparent thermal insulating laminate to be applied to the glass portions of windowpanes of buildings, greenhouses and refrigerated and cooled showcases.

The selectively light-transmitting laminated structure of this invention exhibits a visible light transmittance of at least 50% and an average infrared reflectance of at least 70%, preferably a visible light transmittance of at least 60% and an average infrared reflectance of at least 80%.

The following Examples illustrate the present invention more specifically.

All parts in these examples are by weight unless otherwise specified.

The visible light transmittance and the average infrared reflectance of the laminated structure are determined by the following methods.

Visible light transmittance

The transmittance in a visible region of 450 to 700 mμ is measured. The product of the transmittance and the intensity of solar energy is calculated for every 50 mμ increment in wavelength, and the summation of the products with the above range is divided by the total intensity of solar energy at 450 to 700 mμ. The quotient obtained is defined as the visible light transmittance (%).

Average infrared reflectance

The infrared reflectance was measured by an infrared spectrophotometer (Model EPI-II, manufactured by Hitachi Limited) provided with a reflectance measuring device.

The measurement is carried out in an infrared wavelength region of 3 to 25 μm. The energy radiated from a black body at 300° K. (27° C.) is measured for every 0.2 μm increment in wavelength, and the product of the radiation energy and the infrared reflectance corresponding to the respective wavelengths is calculated for every 0.2 μm increment in wavelength. The summation of the products is calculated within the wavelength region of 3 to 25 μm. The summation of the products is divided by the total of the intensities of radiation energy is the wavelength region of 3 to 25 μm. The quotient obtained represents the average reflectance of the energy (the wavelength region of 3 to 25 μm) radiated from the black body at 300° K.

The radiation energy in the region of 3 to 25 μm corresponds to about 85% of the entire radiation energy of the black body at 300° K.

EXAMPLES 1 TO 3 AND COMPARATIVE EXAMPLES 1 AND 2

A titanium oxide layer having a thickness of 300 Å (layer $B_1$), a layer of an alloy of silver and copper (92% by weight of silver and 8% by weight of copper) having a thickness of 150 Å (layer D), a metallic titanium layer (layer C) and a titanium oxide layer having a thickness of 280 Å (layer $B_2$) were successively laminated to a biaxially oriented polyethylene terephthalate film having a light transmittance of 86% and a thickness of 50 microns to obtain a selectively light-transmitting laminated structure.

Each of the titanium oxide layers was formed by coating from a solution consisting of 3 parts of a tetramer of tetrabutyl titanate and 97 parts of isopropyl alcohol by means of a bar coater and heating the coated layer at 120° C. for 3 minutes.

The silver-copper allow layer was formed by DC sputtering using a silver-copper alloy consisting of 92% by weight of silver and 8% by weight of copper as a target.

The metallic titanium layer (layer C deposited as Ti) was formed in each of the thicknesses shown in Table 1 by vacuum deposition using electron beam heating.

The selectively light-transmitting laminated structure was put into a hot air dryer kept at 90° C. to test it for resistance to accelerated heat degradation. The time (hours) which elapsed until the infrared reflectance (wavelength 10 microns) of the sample decreased to 85% of the initial value was defined as the degradation time.

The results of the test are shown in Table 1 together with the visible light transmittance and average infrared reflectance before the test.

Comparative Example 1 shows the same laminated structure except that the layer C was omitted.

TABLE 1

| Example (Ex.) or Comparative Example (CEx.) | Thickness of the metallic titanium layer (C) (Å) | Visible light transmittance (%) | Average infrared reflectance (%) | Initial infrared reflectance at 10 microns (%) | Degradation time (hours) |
| --- | --- | --- | --- | --- | --- |
| Ex. 1 | 40 | 73 | 92 | 92 | 1,000 |

TABLE 1-continued

| Example (Ex.) or Comparative Example (CEx.) | Thickness of the metallic titanium layer (C) (Å) | Visible light transmittance (%) | Average infrared reflectance (%) | Initial infrared reflectance at 10 microns (%) | Degradation time (hours) |
|---|---|---|---|---|---|
| Ex. 2 | 50 | 73 | 92 | 92 | 1,100 |
| Ex. 3 | 84 | 70 | 92 | 92 | 1,500 |
| CEx. 1 | 0 | 72 | 92 | 91 | 150 |
| CEx. 2 | 150 | 47 | 92 | 92 | — |

The results given in Table 1 show that the laminated structure has poor heat resistance when it does not contain the layer C deposited as Ti, and the degradation time is very short, and that when the thickness of the metallic titanium layer exceeds 100 Å, the laminated structure is not suitable for practical application because of the marked decrease in visible light transmittance.

EXAMPLES 4 AND 5 AND COMPARATIVE EXAMPLES 3 AND 4

A selectively light-transmitting laminated structure was made in substantially the same way as in Example 1 by laminating a titanium oxide layer ($B_1$) having a thickness of 300 Å, a layer (D) of an alloy of silver and copper having a thickness of 150 Å, a metallic titanium layer (C) of each of the thicknesses shown in Table 2 and a titanium oxide layer ($B_2$) having a thickness of 280 Å successively to a biaxially oriented polyethylene terephthalate film (layer A).

Each of the titanium oxide layers $B_1$ and $B_2$ was formed by low-temperature sputtering using a target molded from a commercially available titanium dioxide powder of high purity. A vacuum vessel was evacuated to a high vacuum ($5 \times 10^{-6}$ torr), and argon gas was introduced to a pressure of $5 \times 10^{-3}$ torr. Sputtering was performed in a high frequency electric field in the vessel. The output of the high frequency sputtering was 500 W, and the distance between the substrate and the target was adjusted to 10 cm. The titanium oxide layer $B_1$ was formed by performing the sputtering for 20 minutes, and the titanium oxide layer $B_2$, by performing the sputtering for 18 minutes.

Table 2 summarizes the visible light transmittance, the average infrared reflectance, the initial infrared reflectance (10 microns) and the degradation time of the laminated structure in relation to the thickness of the metallic titanium layer $C_1$.

TABLE 2

| Example (Ex.) or Comparative Example (CEx.) | Thickness of the metallic titanium layer C (Å) | Visible light transmittance (%) | Average infrared reflectance (%) | Initial infrared reflectance at 10 microns (%) | Degradation time (hours) |
|---|---|---|---|---|---|
| Ex. 4 | 50 | 73 | 91 | 92 | 1,000 |
| Ex. 5 | 78 | 71 | 92 | 91 | 1,500 |
| CEx. 3 | 0 | 73 | 92 | 92 | 120 |
| CEx. 4 | 140 | 46 | 92 | 93 | — |

The results given in Table 2 demonstrate that the laminated structure has poor heat resistance when it does not contain the metallic titanium layer C, and when the thickness of the metallic titanium layer exceeds 100 Å, the visible light transmittance of the laminated structure decreases drastically.

EXAMPLES 6 AND 7 AND COMPARATIVE EXAMPLES 5 AND 6

In a laminated structure obtained by providing a titanium oxide layer ($B_1$) having a thickness of 300 Å, a layer (D) of an alloy of silver and copper having a thickness of 150 Å (silver 92% by weight) and a titanium oxide layer ($B_2$) having a thickness of 280 Å successively on a biaxially oriented polyethylene terephthalate film (layer A), each of the various metallic titanium layers (C) deposited as Ti was formed between the silver-copper alloy layer (D) and the titanium oxide layer ($B_1$) or ($B_2$). The various properties of the resulting laminated structures were determined, and the results are shown in Table 3.

The titanium oxide layers $B_1$ and $B_2$ were formed either by the TBT method from the tetramer of tetrabutyl titanate as in Examples 1 to 3, or by the sputtering method as in Examples 4 and 5.

The metallic titanium layers C were formed by vacuum deposition using electron beams.

TABLE 3

| | Comparative Example 5 | Example 6 | Comparative Example 6 | Example 7 |
|---|---|---|---|---|
| Method of forming the Ti oxide layers $B_1$ and $B_2$ | sputtering | sputtering | TBT | TBT |
| Thickness of metallic Ti layer C (Å) | | | | |
| under layer D | 30 | 30 | 35 | 40 |
| On layer D | 0 | 25 | 0 | 30 |
| Visible light transmittance (%) | 73 | 72 | 71 | 70 |
| Average infrared reflectance (%) | 92 | 93 | 92 | 93 |
| Initial infrared reflectance at 10 microns (%) | 92 | 93 | 91 | 92 |
| Degradation time (hours) | 300 | 2,300 | 200 | 2,000 |

EXAMPLES 8 TO 11 AND COMPARATIVE EXAMPLES 7 TO 9

Example 7 was repeated except that a layer of titanium oxide, zirconium oxide or tantalum oxide formed by an ion plating method was used as a reflection inhibiting layer instead of the titanium oxide film layer formed from the tetramer of tetrabutyl titanate, and the thickness of the layer C deposited as metallic titanium was changed as shown in Table 4.

The ion plating was carried out under the following conditions.

Oxygen gas partial pressure: $5 \times 10^{-4}$ torr
High-frequency power (13.56 MHz): 200 W The thickness of the reflection inhibiting layer was 300 Å in all Examples and Comparative Examples.

The results are shown in Table 4.

TABLE 4

| Example (Ex.) or Comparative Example (CEx.) | High-refractive reflection inhibiting layers $B_1$ and $B_2$ | Thickness of the Ti layers C (Å) | Visible light transmittance (%) | Average infrared reflectance (%) | Initial infrared reflectance at 10 microns (%) | Degradation time (hours) |
|---|---|---|---|---|---|---|
| Ex. 8  | Ti oxide | 35 | 73 | 92 | 92 | 2000 |
| Ex. 9  | Ti oxide | 60 | 71 | 93 | 92 | >3000 |
| Ex. 10 | Zr oxide | 40 | 72 | 92 | 93 | >2000 |
| Ex. 11 | Ta oxide | 35 | 72 | 92 | 92 | >2000 |
| CEx. 7 | Ti oxide | 0  | 73 | 91 | 92 | 100 |
| CEx. 8 | Zr oxide | 0  | 72 | 92 | 91 | 180 |
| CEx. 9 | Ta oxide | 0  | 72 | 91 | 92 | 200 |

EXAMPLES 12 AND 13 AND COMPARATIVE EXAMPLE 10

A titanium oxide layer having a thickness of 300 Å (layer $B_1$), a layer of an alloy of silver and copper having a thickness of 150 Å (layer D), a silicon layer (C) deposited as Si and a titanium oxide film layer having a thickness of 280 Å (layer $B_2$) were successively laminated to a biaxially oriented polyethylene terephthalate film having a light transmittance of 86% and a a thickness of 50 microns (layer A) to obtain a selectively light-transmitting laminated structure.

The titanium oxide film layer $B_1$ and $B_2$ and the alloy layer D were formed as in Example 1.

The silicon layer C was formed in each of the thicknesses shown in Table 5 by vacuum deposition using electron beam heating.

The results are shown in Table 5.

Comparative Example 8 shows the same laminated structure but not containing the silicon layer C.

TABLE 5

| Example (Ex.) or Comparative Example (CEx.) | Thickness of the silicon layer (Å) | Visible light transmittance (%) | Average infrared reflectance (%) | Initial infrared reflectance at 10 microns (%) | Degradation time (hours) |
|---|---|---|---|---|---|
| Ex. 12  | 50  | 71 | 92 | 92 | 1,100 |
| Ex. 13  | 70  | 70 | 92 | 92 | 1,500 |
| CEx. 10 | 150 | 47 | 92 | 92 | — |

The results given in Table 5 show that when the the thickness of the silicon layer exceeds 100 Å, the laminated structure is not suitable for practical application because of the extreme decrease of its visible light transmittance.

EXAMPLES 14 AND 15 AND COMPARATIVE EXAMPLES 11 AND 12

In substantially the same way as in Example 1, a selectively light-transmitting laminated structure was made by laminating a titanium oxide layer $B_1$ having a thickness of 300 Å, a layer D of silver having a thickness of 150 Å, a titanium layer C deposited as titanium of each of the various thicknesses shown in Table 6, and a titanium oxide layer $B_2$ having a thickness of 280 Å successively to a biaxially oriented polyethylene terephthalate film (layer A).

The titanium oxide film layers $B_1$ and $B_2$ were formed in the same way as in Example 1.

The results are shown in Table 6.

TABLE 6

| Example (Ex.) or Comparative Example (CEx.) | Thickness of the titanium layer (Å) | Visible light transmittance (%) | Average infrared reflectance (%) | Initial infrared reflectance at 10 microns (%) | Degradation time (hours) |
|---|---|---|---|---|---|
| Ex. 14  | 30  | 72 | 91 | 92 | 1,200 |
| Ex. 15  | 65  | 69 | 92 | 91 | 1,800 |
| CEx. 11 | 0   | 73 | 92 | 92 | 180 |
| CEx. 12 | 140 | 46 | 92 | 93 | — |

The results shown in Table 6 demonstrate that the laminated structure has poor heat resistance when it does not contain the titanium layer C, and that when the thickness of the titanium layer C exceeds 100 Å, the visible light transmittance of the laminated structure decreases drastically.

EXAMPLES 16 AND 17

In a laminated structure obtained by laminating a titanium oxide layer $B_1$ having a thickness of 300 Å, a layer D of an alloy of silver and gold having a thickness of 150 Å (92% by weight of silver) and a titanium oxide layer $B_2$ having a thickness of 280 Å successively to a biaxially oriented polyethylene terephthalate film (layer A), a silicon layer C having each of the thicknesses shown in Table 7 was formed between the silver-gold alloy layer D and each of the titanium oxide film layers $B_1$ and $B_2$. The results are shown in Table 7.

The titanium oxide film layers $B_1$ and $B_2$ were formed either by the TBT method or by the sputtering method as in Examples 12 and 13 and Examples 14 and 15, respectively.

The silicon layer C was formed by vacuum depositing using electron beams.

TABLE 7

|  | Example 16 | Example 17 |
|---|---|---|
| Method of forming the Ti oxide layers $B_1$ and $B_2$ | sputtering | TBT |
| Thickness of the Si layer (Å) | | |
| under layer C | 30 | 25 |
| on layer C | 25 | 30 |
| Visible light transmittance (%) | 70 | 70 |
| Average infrared reflectance (%) | 93 | 93 |
| Initial infrared reflectance at 10 microns (%) | 93 | 92 |
| Degradation time (hours) | 2,400 | 2,000 |

EXAMPLES 18 TO 21

Example 12 was repeated except that a layer of titanium oxide, zirconium oxide or tantalum oxide formed by an ion plating method was used as a reflection inhibiting layer instead of the titanium oxide layer prepared from the tetramer of tetrabutyl titanate, and the thickness of the silicon metal layer was changed as shown in Table 8.

The ion plating was performed under the same conditions as in Example 8.

The results are shown in Table 8.

TABLE 8

| Example | High-re-fractive layers B₁ and B₂ | Thickness of the Si layer (Å) | Visible light transmittance (%) | Average infrared reflectance (%) | Initial infrared reflectance at 10 microns (%) | Degradation time (hours) |
|---|---|---|---|---|---|---|
| 18 | Ti oxide | 35 | 73 | 92 | 92 | 1,000 |
| 19 | Ti oxide | 60 | 71 | 93 | 92 | 1,800 |
| 20 | Zr oxide | 35 | 72 | 92 | 93 | 1,000 |
| 21 | Ta oxide | 40 | 71 | 92 | 92 | 1,000 |

EXAMPLES 22 TO 24 AND COMPARATIVE EXAMPLE 13

A titanium oxide layer ($B_1$) having a thickness of 300 Å, a carbon layer (C), a layer (D) of an alloy of silver and copper (92% by weight of silver and 8% by weight of copper) having a thickness of 150 Å, a carbon layer (C) and a titanium oxide layer ($B_2$) having a thickness of 280 Å were laminated successively to a biaxially oriented polyethylene terephthalate film having a light transmittance of 86% and a thickness of 50 microns (layer A) to obtain a selectively light-transmitting laminated structure.

The titanium oxide layers $B_1$ and $B_2$ and the silver-copper alloy layers were formed in the same way as in Example 12.

The layer C deposited as carbon was formed by vacuum deposition using electron beam heating, and its thickness was as shown in Table 9.

The results are shown in Table 9.

TABLE 9

| Example (Ex.) or Comparative Example (CEx.) | Thickness of the carbon layer C (Å) under layer D | Thickness of the carbon layer C (Å) on layer D | Visible light transmittance (%) | Average infrared reflectance (%) | Initial infrared reflectance at 10 microns (%) | degradation time (hours) |
|---|---|---|---|---|---|---|
| Ex. 22 | 15 | 20 | 73 | 92 | 91 | 1,200 |
| Ex. 23 | 35 | 54 | 72 | 91 | 91 | 2,500 |
| Ex. 24 | 65 | 70 | 68 | 91 | 92 | >4,000 |
| CEx. 13 | 130 | 120 | 45 | 92 | 92 | — |

The results given in Table 9 demonstrate that when the thickness of the carbon layer C exceeds 100 Å, the visible light transmittance of the laminated structure decreases drastically.

EXAMPLES 25 TO 27 AND COMPARATIVE EXAMPLE 14

A titanium oxide layer ($B_1$) having a thickness of 300 Å, a layer (D) of an alloy of silver and copper having a thickness of 150 Å, a carbon layer C having the thickness shown in Table 10, and titanium oxide layer ($B_2$) having a thickness of 280 Å were laminated successively to a biaxially oriented polyethylene terephthalate (layer A) in the same way as in Example 22 to make a selectively light-transmitting laminated structure.

The results are shown in Table 10.

TABLE 10

| Example (Ex.) or Comparative Example (CEx.) | Thickness of the carbon layer C (Å) | Visible light transmittance (%) | Average infrared reflectance (%) | Initial infrared reflectance at 10 microns (%) | Degradation time (hours) |
|---|---|---|---|---|---|
| Ex. 25 | 30 | 73 | 92 | 92 | 1,200 |
| Ex. 26 | 60 | 72 | 91 | 92 | 2,000 |
| Ex. 27 | 70 | 71 | 92 | 92 | 3,900 |
| CEx. 14 | 140 | 44 | 92 | 92 | — |

The results given in Table 10 demonstrate that when the thickness of the carbon layer C exceeds 100 Å, the visible light transmittance of the laminated layer decreases drastically.

EXAMPLES 28 TO 31

Example 22 was repeated except that a layer of titanium oxide, zirconium oxide or tantalum oxide formed by an ion plating method was used as a reflection inhibiting layer instead of the titanium oxide layer formed from the tetramer of tetrabutyl titanate, and the thickness of the carbon layer was changed as shown in Table 11.

The ion plating was performed under the same conditions as in Example 8.

The results are shown in Table 11.

TABLE 11

| | Example 28 | Example 29 | Example 30 | Example 31 |
|---|---|---|---|---|
| High-refractive reflection inhibiting layers B₁ and B₂ | Ti oxide | Ti oxide | Zr oxide | Ta oxide |
| Thickness of carbon layer (Å) beneath layer D | 20 | 35 | 30 | 30 |
| Thickness of carbon layer (Å) on layer D | 40 | 55 | 40 | 45 |
| Visible light transmittance (%) | 73 | 71 | 70 | 70 |
| Average infrared reflectance (%) | 92 | 92 | 92 | 92 |
| Initial infrared reflectance at 10 microns (%) | 92 | 92 | 91 | 92 |
| Degradation time (hours) | 1,600 | 2,400 | 2,000 | 1,800 |

EXAMPLES 32 TO 34 AND COMPARATIVE EXAMPLES 15 AND 16

A titanium oxide layer ($B_1$) having a thickness of 300 Å, a layer (D) of an alloy of silver and copper (95% by weight of silver and 5% by weight of copper) having a thickness of 150 Å, a metallic cobalt layer (C) deposited as Co and a titanium oxide film layer ($B_2$) having a thickness of 280 Å were successively laminated to a biaxially oriented polyethylene terephthalate film having a light transmittance of 86% and a thickness of 50 microns (layer A) to obtain a selectively light-transmitting laminated structure.

The titanium oxide layers $B_1$ and $B_2$ and the silver-copper alloy layer D were formed as in Example 1.

The metallic cobalt layer C was formed in each of the thicknesses shown in Table 12 by vacuum deposition using electron beam heating.

The results are shown in Table 12.

TABLE 12

| Example (Ex.) or Comparative Example (CEx.) | Thickness of the Co layer (C) (Å) | Visible light transmittance (%) | Average infrared reflectance (%) | Initial infrared reflectance at 10 microns (%) | Degradation time (hours) |
|---|---|---|---|---|---|
| Ex. 32 | 30 | 73 | 91 | 92 | 1,000 |
| Ex. 33 | 50 | 73 | 92 | 92 | 1,100 |
| Ex. 34 | 84 | 68 | 92 | 92 | 2,000 |
| CEx. 15 | 0 | 71 | 92 | 91 | 180 |
| CEx. 16 | 150 | 47 | 92 | 92 | — |

The results given in Table 12 demonstrate that the laminated structure has poor heat resistance when it does not contain the metallic cobalt layer C, and that when the thickness of the metallic cobalt layer C exceeds 100 Å, the visible light transmittance of the laminated structure drastically decreases.

EXAMPLES 35 TO 37 AND COMPARATIVE EXAMPLES 17 AND 18

Example 32 was repeated except that metallic nickel was used instead of the metallic cobalt. The metallic nickel layer C was formed by vacuum deposition using electron beam heating.

The thickness of the metallic nickel layers and the results are shown in Table 13.

TABLE 13

| Example (Ex.) or Comparative Example (CEx.) | Thickness of the Ni layer (Å) | Visible light transmittance (%) | Average infrared reflectance (%) | Initial infrared reflectance at 10 microns (%) | Degradation time (hours) |
|---|---|---|---|---|---|
| Ex. 35 | 30 | 71 | 92 | 91 | 1,100 |
| Ex. 36 | 50 | 71 | 91 | 92 | 1,600 |
| Ex. 37 | 80 | 67 | 92 | 92 | 3,000 |
| CEx. 17 | 0 | 72 | 92 | 91 | 150 |
| CEx. 18 | 150 | 44 | 92 | 92 | — |

The results given in Table 13 demonstrate that the laminated structure has poor heat resistance when it does not contain the metallic nickel layer C, and the degradation time is very short, and that when the thickness of the metallic nickel layer C exceeds 100 Å, the visible light transmittance of the laminated structure decreases drastically to render it infeasible in practical application.

EXAMPLES 38 TO 41 AND COMPARATIVE EXAMPLES 19 TO 21

In substantially the same away as in Example 32, a titanium oxide layer ($B_1$) having a thickness of 300 Å, a layer of an alloy of silver and copper having a thickness of 150 Å, a metallic cobalt or nickel layer C deposited as Co or Ni having each of the thicknesses shown in Table 14 and a titanium oxide layer $B_2$ having a thickness of 280 Å were successively laminated to a biaxially oriented polyethylene terephthalate film (layer A) to make a selectively light-transmitting laminated structure.

The titanium oxide film layers $B_1$ and $B_2$ were formed in the same way as in Examples 4 and 5.

The results are shown in Table 14.

TABLE 14

| Example (Ex.) or Comparative Example (CEx.) | Metallic layer Metal | Metallic layer Thickness (Å) | Visible light transmittance (%) | Average infrared reflectance (%) | Initial infrared reflectance at 10 microns (%) | Degradation time (hours) |
|---|---|---|---|---|---|---|
| Ex. 38 | Cobalt | 40 | 71 | 91 | 92 | 1,400 |
| Ex. 39 | Cobalt | 78 | 68 | 92 | 91 | 2,000 |
| Ex. 40 | Nickel | 35 | 71 | 92 | 92 | 1,300 |
| Ex. 41 | Nickel | 60 | 70 | 92 | 92 | 1,800 |
| CEx. 19 | — | — | 73 | 92 | 92 | 110 |
| CEx. 20 | Cobalt | 140 | 46 | 92 | 93 | — |
| CEx. 21 | Nickel | 130 | 44 | 92 | 92 | — |

The results shown in Table 14 demonstrate that the laminated structure has poor heat resistance when it does not contain the metallic cobalt or nickel layer C, and that when the thickness of the metallic cobalt or nickel layer C exceeds 100 Å, the visible light transmittance of the laminated structure decreases drastically.

EXAMPLES 42 TO 45

In a laminated structure obtained by laminating a titanium oxide layer $B_1$ having a thickness of 300 Å, a layer D of an alloy of silver and copper (92% by weight of silver), and a titanium oxide layer $B_2$ having a thickness of 280 Å to a biaxially oriented polyethylene terephthalate film (layer A), a metallic cobalt or metallic nickel layer C was provided between the silver-copper alloy layer D and each of the titanium oxide layers $B_1$ and $B_2$.

The titanium oxide film layers $B_1$ and $B_2$ were formed either by the TBT method as in Example 32 or by the sputtering method as in Example 38.

The metallic cobalt layer and the metallic nickel layer C were provided by vacuum deposition using electron beam.

The results are shown in Table 15.

TABLE 15

| | Example 42 | Example 43 | Example 44 | Example 45 |
|---|---|---|---|---|
| Method of forming the Ti oxide layers | Sputtering | Sputtering | TBT | TBT |
| Metallic layer on the layer D | | | | |
| Metal | Co | Ni | Co | Ni |
| Thickness (Å) | 30 | 35 | 30 | 35 |
| Metallic layer under the layer D | | | | |
| Metal | Co | Ni | Co | Ni |
| Thickness (Å) | 50 | 50 | 45 | 50 |
| Visible light transmittance (%) | 72 | 70 | 71 | 70 |
| Average infrared reflectance (%) | 92 | 92 | 92 | 92 |
| Initial infrared reflectance at 10 microns (%) | 92 | 92 | 91 | 92 |
| Degradation time (hours) | 2,800 | 2,700 | 2,600 | 3,000 |

EXAMPLES 46 TO 49 AND COMPARATIVE EXAMPLES 22 TO 24

Example 32 was repeated except that a layer of titanium oxide, zirconium oxide or tantalum oxide formed by an ion plating method was used as a reflection inhibiting layer instead of the titanium oxide layer prepared from the tetramer of tetrabutyl titanate, and the thickness of the metallic cobalt or metallic nickel layer was changed as shown in Table 16.

The ion plating was performed under the same conditions as in Example 8.

The results are shown in Table 16.

TABLE 16

| Example (Ex.) or Comparative Example (CEx.) | High-refractive reflection inhibiting layer | Metallic layer metal | Metallic layer thickness (Å) | Visible light trans- mittance (%) | Average infrared reflec- tance (%) | Initial infrared relfec- tance at 10 microns (%) | Degra- dation time (hours) |
|---|---|---|---|---|---|---|---|
| Ex. 46 | Ti oxide | Co | 40 | 73 | 92 | 92 | 1,400 |
| Ex. 47 | Ti oxide | Ni | 50 | 71 | 93 | 92 | 1,800 |
| Ex. 48 | Zr oxide | Co | 35 | 72 | 92 | 93 | 1,000 |
| Ex. 49 | Ta oxide | Co | 35 | 71 | 92 | 92 | 1,000 |
| CEx. 22 | Ti oxide | — | — | 73 | 91 | 92 | 90 |
| CEx. 23 | Zr oxide | — | — | 72 | 92 | 91 | 180 |
| CEx. 24 | Ta oxide | — | — | 72 | 91 | 92 | 190 |

EXAMPLES 50 TO 53

A laminated structure was produced in the same way as in Example 7 except that the titanium oxide layers obtained by the TBT method as the layers $B_1$ and $B_2$ were changed to zirconium oxide thin layers prepared from tetrabutoxy zirconate, and the layer D of an alloy of silver and copper was changed to a layer of silver alone, a silver-gold alloy or a silver-copper alloy having a thickness of 160 Å.

The zirconium oxide layer was provided by coating from a solution consisting of 7 parts of tetrabutoxy zirconate, 40 parts of n-hexane, 20 parts of ligroin and 33 parts of n-butanol, and drying the coating at 130° C. for 5 minutes.

The silver layer, silver-gold alloy layer and silver-copper alloy layer were provided by DC sputtering using silver or a silver-gold alloy (90% by weight of silver and 10% by weight of gold) or a silver-copper alloy (92% by weight of silver and 8% by weight of copper) as a target. The results are shown in Table 17.

TABLE 17

| | Example 50 | Example 51 | Example 52 | Example 53 |
|---|---|---|---|---|
| Layer D | Ag—Cu | Ag | Ag—Cu | Ag—Cu |
| Metallic titanium Layer (thickness Å) | | | | |
| beneath the layer D | 20 | 25 | 15 | 0 |
| on the layer D | 30 | 30 | 30 | 30 |
| Visible trans- mittance (%) | 65 | 64 | 62 | 63 |
| Average infrared reflectance (%) | 92 | 93 | 92 | 92 |
| Infrared reflectance (%) | 92 | 92 | 92 | 91 |//

TABLE 17-continued

| | Example 50 | Example 51 | Example 52 | Example 53 |
|---|---|---|---|---|
| Degradation time (hours) | 2,000 | 1,800 | >2,000 | 1,500 |

EXAMPLES 54 TO 58 AND COMPARATIVE EXAMPLE 25

A laminated structure was produced in the same way as in Example 7 except that the layers C and the layers $B_1$ and $B_2$ were formed as shown in Table 18. A transparent top layer (E) having a thickness of 2 microns was formed on the surface of the laminated layer by wet-method coating from a solution of polyacrylonitrile in cyclohexanone.

The properties of the resulting laminated structure are shown in Table 18.

TABLE 18

| Example (Ex.) or Comparative Example (CEx.) | Layer $B_1$ | Layer $B_2$ | Thickness of the Ti layer C (Å) Beneath the layer D | Thickness of the Ti layer C (Å) on the layer D | Visible light trans- mittance (%) | Average infrared reflec- tance (%) | Infrared reflec- tance (%) (9.8 microns) | Degra- dation time (hours) |
|---|---|---|---|---|---|---|---|---|
| Ex. 54 | Yes | Yes | 20 | 30 | 64 | 78 | 88 | >3,000 |
| Ex. 55 | Yes | No | 15 | 25 | 60 | 79 | 89 | >3,000 |
| Ex. 56 | No | Yes | 20 | 25 | 58 | 78 | 89 | >3,000 |
| CEx. 25 | Yes | Yes | 0 | 0 | 63 | 78 | 88 | 350 |
| Ex. 57 | Yes | Yes | 35 | 55 | 62 | 79 | 89 | >5,000 |
| Ex. 58 | Yes | No | 33 | 60 | 56 | 78 | 89 | >5,000 |

EXAMPLES 59 AND 60

A laminated structure was produced in the same way as in Example 7 except that the thickness of the metallic titanium layers C were changed as shown in Table 19. The properties of the laminated structures are shown in Table 19.

TABLE 19

| Example | Thickness of the metallic titanium layer C (Å) beneath the layer D | Thickness of the metallic titanium layer C (Å) on the layer D | Visible light trans- mittance (%) | Infrared reflec- tance (%) | Degra- dation time (hours) |
|---|---|---|---|---|---|
| 59 | 40 | 55 | 70 | 92 | >3,000 |
| 60 | 50 | 70 | 67 | 92 | >5,000 |

What we claim is:

1. A selectively light-transmitting laminated structure having the following layers:

(1) a substrate layer (A) of a transparent sheet-like structure, (2) a heat wave-reflective layer (D) of a silver-containing metal having a thickness of 50–300 Å, (3) a single layer (C) deposited as elemental titanium (Ti) and having a thickness of 25 to 100 Å, or said layer (C) on each side of layer (D), said layers (C) having a minimum total thickness of 10 Å and a maximum total thickness of 100 Å, (4) at least one transparent thin layer (B) having a thickness of 50–500 Å and a high refractive index, said layers being in contact with each other in the order: (A)-(B)-(D)-(C), (A)-(B)-(D)-(C)-(B), (A)-(D)-(C)-(B), (A)-(B)-(C)-(D)-(C), (A)-(C)-(D)-(C)-(B) or (A)-(B)-(C)-(D)-(C)-(B) and (5) optionally, a transparent top layer (E).

2. A selectively light-transmitting laminated structure having the following layers:

(1) a substrate layer (A) of a transparent sheet-like structure, (2) a heat wave-reflective layer (D) of a silver-containing metal having a thickness of 50–300 Å

(3) a layer (C) deposited as elemental zirconium (Zr) or elemental carbon and having a thickness of 25–100 Å, or said layer (C) on each side of layer (D), said layer (C) having a minimum total thickness of 10 Å and a maximum total thickness of 100 Å, (4) at least one transparent thin layer (B) having a thickness of 50–500 Å and a high refractive index, said layers being in contact with each other in the order: (A)-(B)-(D)-(C), (A)-(B)-(D)-(C)-(B), (A)-(D)-(C)-(B), (A)-(B)-(C)-(D)-(C), (A)-(C)-(D)-(C)-(B), or (A)-(B)-(C)-(D)-(C)-(B), and (5) optionally, a transparent top layer (E).

3. The laminated structure of claim 1 having a single layer (C) wherein said layers are in contact with each other in the order: (A)-(B)-(D)-(C), (A)-(B)-(D)-(C)-(B) or (A)-(D)-(C)-(B).

4. The laminated structure of claim 1 wherein the two layers (C) are present, said layers being in contact with each other in the order: (A)-(B)-(C)-(D)-(C), (A)-(C)-(D)-(C)-(B) or (A)-(B)-(C)-(D)-(C)-(B).

5. The laminated structure of claim 2 having a single layer (C) wherein said layers are in contact with each other in the order: (A)-(B)-(D)-(C), (A)-(B)-(D)-(C)-(B) or (A)-(D)-(C)-(B).

6. The laminated structure of claim 2 wherein the two layers (C) are present, said layers being in contact with each other in the order: (A)-(B)-(C)-(D)-(C), (A)-(C)-(D)-(C)-(B) or (A)-(B)-(C)-(D)-(C)-(B).

7. The selectively light-transmitting laminated structure of claim 1 wherein the layer (D) is a layer of silver, a layer of silver containing up to 30% by weight of copper, or a layer of silver containing up to 30% by weight of gold.

8. The selectively light-transmitting laminated structure of claim 2 wherein the layer (D) is a layer of silver, a layer of silver containing up to 30% by weight of copper, or a layer of silver containing up to 30% by weight of gold.

9. The laminated structure of claim 1 wherein each of the layers (B) is a layer of an oxide of a metal selected from the group consisting of Ti, In, Zn, Sn, Y, Er, Zr, Ce, Ta and Hf or a layer of ZnS.

10. The laminated structure of claim 2 wherein each of the layers (B) is a layer of an oxide of a metal selected from the group consisting of Ti, In, Zn, Sn, Y, Er, Zr, Ce, Ta and Hf or a layer of ZnS.

11. The laminated structure of claim 1 wherein each of the layers (B) is a thin layer of an oxide of titanium derived from a layer of an organic titanium compound and containing an organic residual moiety of the organic titanium compound.

12. The laminated structure of claim 2 wherein each of the layers (B) is a thin layer of an oxide of titanium derived from a layer of an organic titanium compound and containing an organic residual moiety of the organic titanium compound.

13. The laminated structure of claim 1 which has a visible light transmittance of at least 50% and an average infrared reflectance of at least 70%.

14. The laminated structure of claim 2 which has a visible light transmittance of at least 50% and an average infrared reflectance of at least 70%.

15. The laminated structure of claim 1 which has a visible light transmittance of at least 60% and an average infrared reflectance of at least 80%.

16. The laminated structure of claim 2 which has a visible light transmittance of at least 60% and an average infrared reflectance of at least 80%.

17. The laminated structure of claim 3 wherein the single layer (C) has a minimum thickness of 30 Å.

18. The laminated structure of claim 4 wherein the two layers (C) have a minimum thickness of about 15 Å.

19. The laminated structure of claim 5 wherein the single layer (C) has a thickness of at least 25 Å.

20. The laminated structure of claim 6 wherein the two layers (C) have a total minimum thickness of about 15 Å.

21. A selectively light-transmitting laminated structure having the following layers:

(1) a substrate layer (A) of a transparent sheet-like structure, (2) a heat wave-reflective layer (D) of a silver-containing metal having a thickness of 50–300 Å, (3) a single layer (C) deposited as elemental titanium (Ti) and having a thickness of 25 to 100 Å, or said layer (C) on each side of layer (D), said layers (C) having a minimum total thickness of 10 Å and a maximum total thickness of 100 Å, (4) at least one transparent thin layer (B) having a thickness of 50–500 Å and a high refractive index, said layers being in contact with each other in the order: (A)-(B)-(D)-(C), (A)-(B)-(D)-(C)-(B), (A)-(D)-(C)-(B), (A)-(B)-(C)-(D)-(C), (A)-(C)-(D)-(C)-(B) or (A)-(B)-(C)-(D)-(C)-(B) and (5) a transparent top layer (E) of an acrylic resin or a polyolefin resin having a thickness of 0.05 to 10 microns.

22. The laminated structure of claim 21 wherein the resin is polymethyl methacrylate resin, polyacrylonitrile resin, polymethacrylonitrile resin or polypropylene.

23. A selectively light-transmitting laminated structure having the following layers:

(1) a substrate layer (A) of a transparent sheet-like structure, (2) a heat wave-reflective layer (D) of a silver-containing metal having a thickness of 50–300 Å, (3) a layer (C) deposited as elemental zirconium (Zr) or elemental carbon and having a thickness of 25–100 Å, or said layer (C) on each side of layer (D), said layer (C) having a minimum total thickness of 10 Å, (4) at least one transparent thin layer (B) having a thickness of 50–500 Å and a high refractive index, said layers being in contact with each other in the order: (A)-(B)-(D)-(C), (A)-(B)-(D)-(C)-(B), (A)-(D)-(C)-(B), (A)-(B)-(C)-(D)-(C), (A)-(C)-(D)-(C)-(B), or (A)-(B)-(C)-(D)-(C)-(B), and (5) a transparent top layer (E) of an acrylic resin or a polyolefin resin having a thickness of 0.05 to 10 microns.

24. The laminated structure of claim 23 wherein the resin is polymethyl methacrylate resin, polyacrylonitrile resin, polymethacrylonitrile resin or polypropylene.

* * * * *

UNITED STATES PATENT AND TRADEMARK OFFICE
CERTIFICATE OF CORRECTION

PATENT NO. : 4,413,877
DATED : November 8, 1983
INVENTOR(S) : Kazutomi Suzuki; Hitoshi Mikoshiba and Yuji Mitani It is certified that error appears in the above—identified patent and that said Letters Patent is hereby corrected as shown below:

Item [30] Foreign Application Priority Data reading
"Mar. 10, 1980 [JP] Japan .........55-24238" should read --
Mar. 10, 1980 [JP] Japan .........55-29238 --.

Signed and Sealed this

Seventh Day of February 1984

[SEAL]

Attest:

Attesting Officer

GERALD J. MOSSINGHOFF

Commissioner of Patents and Trademarks